United States Defensive Publication [19] (H) [11] T989,005

Murray [43] Dec. 4, 1979

[54] NICKEL ORGANIC COMPOSITIONS TO IMPROVE DYEABILITY OF POLYMERS

[75] Inventor: Robert W. Murray, Lebanon, N.J.

[73] Assignee: American Cyanamid Company, Stamford, Conn.

[21] Appl. No.: 12,978

[22] Filed: Feb. 21, 1979

[51] Int. Cl.[2] ..... D06P 5/00

[52] U.S. Cl. ..... 526/4; 8/4; 8/29; 8/168 D; 260/45.75 N; 260/429 R; 260/439 R

[57] ABSTRACT

Nickel organic compositions prepared from a nickel salt of a 1,3-diketone of the formula

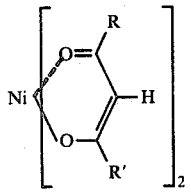

wherein R and R' are independently $C_1$–$C_8$ alkyl; and sulfonyl dialkylphenols of the formula

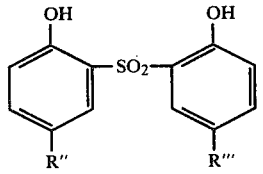

wherein R'' and R''' are independently $C_1$–$C_{12}$ alkyl are used to provide polymer compositions which have improved dyeability after exposure to high temperatures. Preferably, the nickel salt of acetyl-acetone and 2,2'-sulfonylbis-(4-t-octylphenol) are reacted together and the polymer is a polyolefin. Most preferably, the polyolefin is polypropylene.

10 Claims, No Sheets Drawing,

17 Pages Specification

The file of this unexamined application may be inspected and copies thereof may be purchased (849 O.G. 1221, Apr. 9, 1968).